US009037321B2

(12) United States Patent
Conner et al.

(10) Patent No.: US 9,037,321 B2
(45) Date of Patent: May 19, 2015

(54) AIRBORNE ADVISORY FOR INADVERTENT APPROACH TO TAXIWAY

(75) Inventors: Kevin J Conner, Kent, WA (US); Ratan Khatwa, Sammamish, WA (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 1872 days.

(21) Appl. No.: 11/459,910

(22) Filed: Jul. 25, 2006

(65) Prior Publication Data

US 2008/0027596 A1 Jan. 31, 2008

(51) Int. Cl.

| | |
|---|---|
| ***G06F 19/00*** | (2011.01) |
| ***G08G 5/02*** | (2006.01) |
| ***G08G 5/00*** | (2006.01) |

(52) U.S. Cl.

CPC .............. *G08G 5/025* (2013.01); *G08G 5/0021* (2013.01)

(58) Field of Classification Search

CPC ... G08G 5/065; G08G 5/0013; G08G 5/0021; G08G 5/025; G08G 5/006; G01C 23/005; G01C 21/26; G01C 23/00; G01S 19/15; G01S 19/51; G01S 2013/916

USPC .......... 701/120, 301; 340/945, 961, 958, 959, 340/963

See application file for complete search history.

(56) References Cited

U.S. PATENT DOCUMENTS

| | | | | |
|---|---|---|---|---|
| 5,675,661 | A * | 10/1997 | Richman et al. | 382/104 |
| 6,445,310 | B1 | 9/2002 | Bateman et al. | |
| 6,477,449 | B1 | 11/2002 | Conner et al. | |
| 6,577,931 | B2 | 6/2003 | Conner et al. | |
| 6,606,563 | B2 | 8/2003 | Corcoran, III | |
| 6,983,206 | B2 * | 1/2006 | Conner et al. | 701/301 |
| 7,079,951 | B2 | 7/2006 | Conner et al. | |
| 7,112,745 | B2 | 9/2006 | Hatori | |
| 7,117,089 | B2 | 10/2006 | Khatwa et al. | |
| 7,126,534 | B2 * | 10/2006 | Smith et al. | 342/456 |
| 7,206,698 | B2 | 4/2007 | Conner et al. | |
| 7,363,145 | B2 | 4/2008 | Conner et al. | |
| 7,479,925 | B2 | 1/2009 | Schell | |
| 2002/0089433 | A1 * | 7/2002 | Bateman et al. | 340/970 |
| 2004/0030465 | A1 * | 2/2004 | Conner et al. | 701/16 |
| 2005/0128129 | A1 * | 6/2005 | Conner et al. | 342/36 |
| 2005/0187677 | A1 * | 8/2005 | Walker | 701/16 |

* cited by examiner

*Primary Examiner* — Redhwan K Mawari

(74) *Attorney, Agent, or Firm* — Ingrassia Fisher & Lorenz, P.C.

(57) ABSTRACT

A taxiway approach advisory system. The system may include a computer-readable memory containing runway information and a processor in data communication with the memory. The processor may include a component for ascertaining the altitude of an aircraft, a component for ascertaining the location of the aircraft, a component for accessing runway information from the memory and determining if the aircraft is within a pre-determined runway envelope based on the altitude and location, and a component for issuing an indication if the aircraft is not within the pre-determined runway envelope.

15 Claims, 4 Drawing Sheets

AIRBORNE ADVISORY FOR INADVERTENT APPROACH TO TAXIWAY

BACKGROUND OF THE INVENTION

Take-offs and landings are two of the more hazardous maneuvers performed by aircraft, due to high volume traffic, inadequate visibility, pilot unfamiliarity with airport layouts, etc. One device for improving safety during runway approach is disclosed in U.S. Pat. No. 6,304,800 issued on Oct. 16, 2001 to Ishihara et al. entitled "Methods, Apparatus and Computer Program Products for Automated Runway Selection," herein incorporated by reference. Another is disclosed in U.S. Pat. No. 6,983,206 issued on Jan. 3, 2006 to Conner, et al. entitled "Ground Operations and Imminent Landing Runway Selection," herein incorporated by reference. Many aircraft approach and land or attempt to land on a taxiway due to visually misaligning with the taxiway instead of the intended landing runway. A significant percentage of all runway incursions and/or taxiway transgressions involve inadvertent approaches to or take-offs from a taxiway. What is needed is a means of detecting and indicating inadvertent taxiway approaches.

SUMMARY OF THE INVENTION

An embodiment of the present invention provides an indication to a pilot on detection of an inadvertent taxiway approach. The advisory may mitigate a potentially unsafe situation by enhancing pilot awareness and improving pilot decision-making. The indication may be visual and/or aural.

An embodiment of the present invention may include a computer-readable memory containing runway information and a processor in data communication with the memory. The processor may include a component for ascertaining the altitude of an aircraft, a component for ascertaining the position (or location) of the aircraft, a component for accessing runway information from the memory and determining whether the aircraft is within a runway envelope of a predetermined runway based on the altitude and location, and a component for issuing an indication if the aircraft is not within the predetermined runway envelope.

As will be readily appreciated from the foregoing summary, the invention provides systems and methods for detecting and indicating inadvertent taxiway approaches.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

Figure 1:
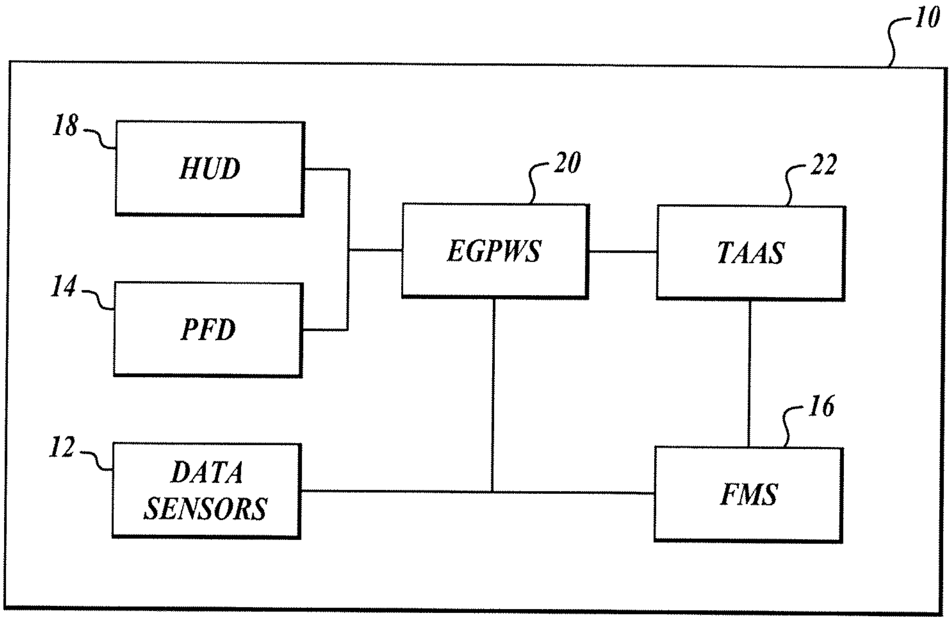
FIG. 1 shows an embodiment of an aircraft according to the several principles of the present invention.

FIG. 1 shows an embodiment of an aircraft 10 according to the present invention. The aircraft 10 includes various data sensors 12, such as a position sensor, an altitude sensor, an airspeed sensor, a track sensor, a heading sensor, etc. The aircraft 10 includes a primary flight display (PFD), a Navigation Display (ND), and/or a Multi-Function Display (MFD) 14 and a Flight. Management System (FMS) 16. The aircraft 10 may additionally include a heads-up display (HUD) 18 and a Terrain Avoidance Warning System (TAWS), such as an Enhanced Ground Proximity Warning System (EGPWS) 20. The aircraft 10 includes a Taxiway Approach Advisory System 22 according to the present invention. The HUD 18 may be in data communication with the PFD 14 and the EGPWS 20. The EGPWS 20, the TAAS 22, and the FMS 16 may all be in data communication with one another, and the data sensors 12 may be in data communication with the EGPWS 20 and the FMS 16.

Figure 2:
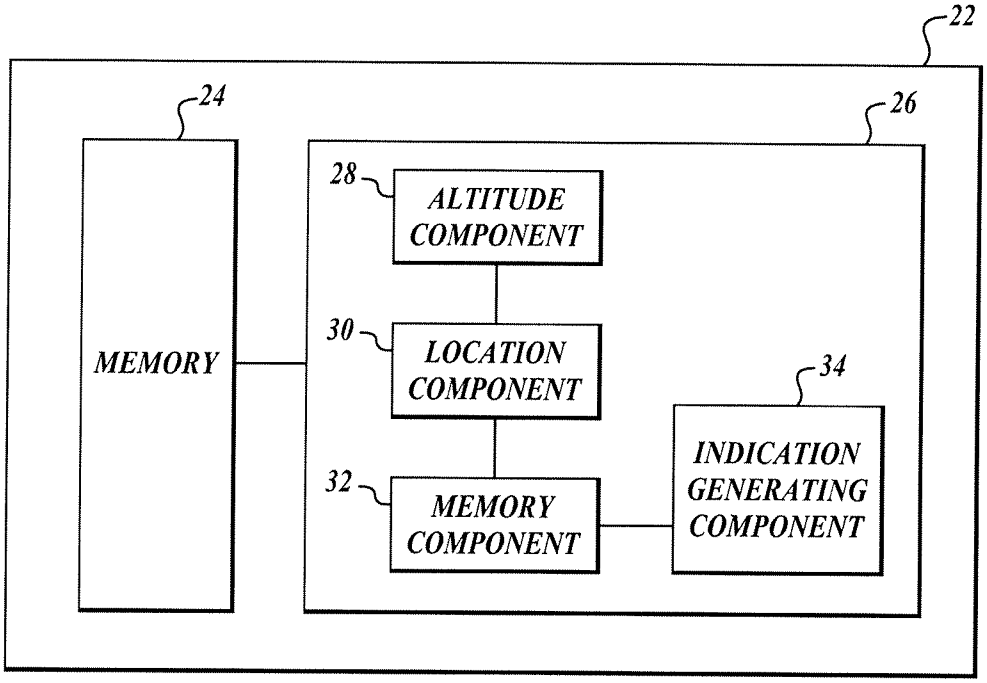
FIG. 2 shows an embodiment of a taxiway approach advisory system according to the present invention.

FIG. 2 shows the TAAS 22. The system 22 includes a computer-readable memory 24 in data communication with a processor 26. The memory 24 includes precise GPS coordinates of airport runways. The processor 26 includes a component 28 for ascertaining an altitude of the aircraft 10 and a component 30 for ascertaining the position of the aircraft 10. The processor 26 also includes a component 32 for accessing runway information from the memory 24 and determining if the aircraft 10 is within a predetermined runway envelope based on the position and altitude of the aircraft 10, and a component 34 for generating an indication if the aircraft 10 is not within a predetermined runway envelope.

In an alternate embodiment, the memory 24 includes precise GPS coordinates of airport taxiways, and the processor 26 includes a component 32 for accessing taxiway information from the memory 24 and determining if the aircraft 10 is within a predetermined taxiway envelope based on the position and altitude of the aircraft 10, and a component 34 for generating an indication if the aircraft 10 is within a predetermined taxiway envelope.

Figure 3A:
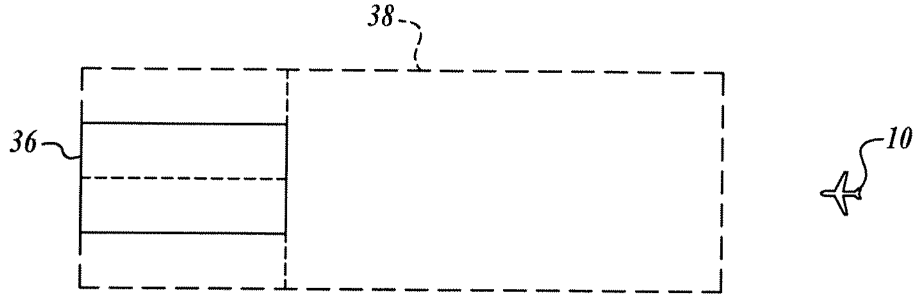
FIGS. 3A and 3B show a runway and runway envelope embodiments according to the present invention.

FIG. 3A shows the aircraft 10, a runway 36, and a runway envelope 38. As the aircraft 10 approaches the runway 36, the system 22 periodically ascertains the altitude of the aircraft 10. If the aircraft 10 is below a pre-determined height, the system 22 ascertains the location of the aircraft 10. In an embodiment, the pre-determined height is 200 feet. Using the stored runway data contained in the memory 24, the system 22 determines if the aircraft 10 is within a predetermined runway envelope 38. The envelope 38 may be compatible with the RAAS envelopes or on-ground operations. In a specific embodiment, the envelope 38 is twice as wide as the runway 36 and extends 1 nautical mile (nm) from the approach end of the runway 36. In other embodiments, the envelope 38 extends 3 nm from the approach end of the runway 36 and is twice the runway width plus 400 feet. If the aircraft 10 is not within the runway envelope 38 and the aircraft descends below 200 feet above ground level, the system 22 generates an indication that the aircraft 10 is not within the runway envelope 38. In an embodiment, the indication is aural, and includes a voice recording of "Approaching taxiway." The indication may include an alert, including an advisory, a caution, and/or a warning. Other embodiments may include text messages displayed on the HUD 18 and/or the EGPWS 20 or a light in the cockpit or a graphical representation on any map display that displays the airport runways.

Figure 3B:
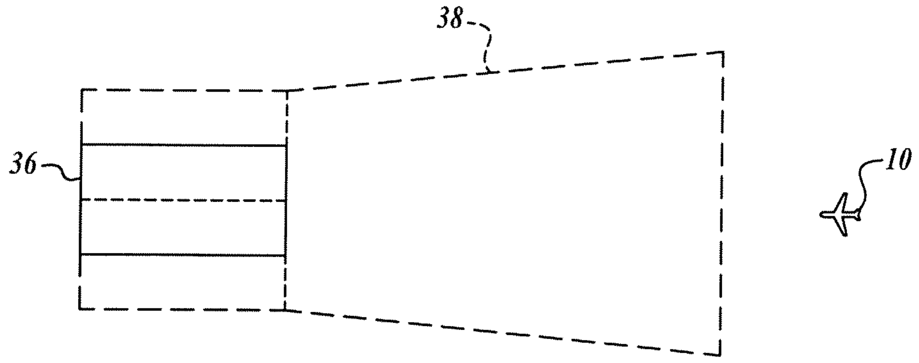

FIG. 3B shows another embodiment of a runway envelope 38. The envelope 38 is widest at the approach end of the envelope 38 and narrows toward the runway 36.

Figure 4:
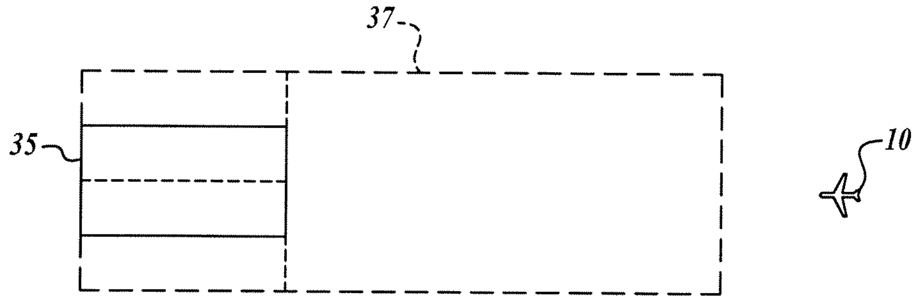
FIG. 4 shows a taxiway and taxiway envelope embodiment according to the present invention.

FIG. 4 shows an embodiment of a taxiway envelope 37. The envelope 37 is twice the width of the taxiway 35 and extends 1 nm from the approach end of the taxiway 35 to the approach end of the taxiway 35.

Figure 5:
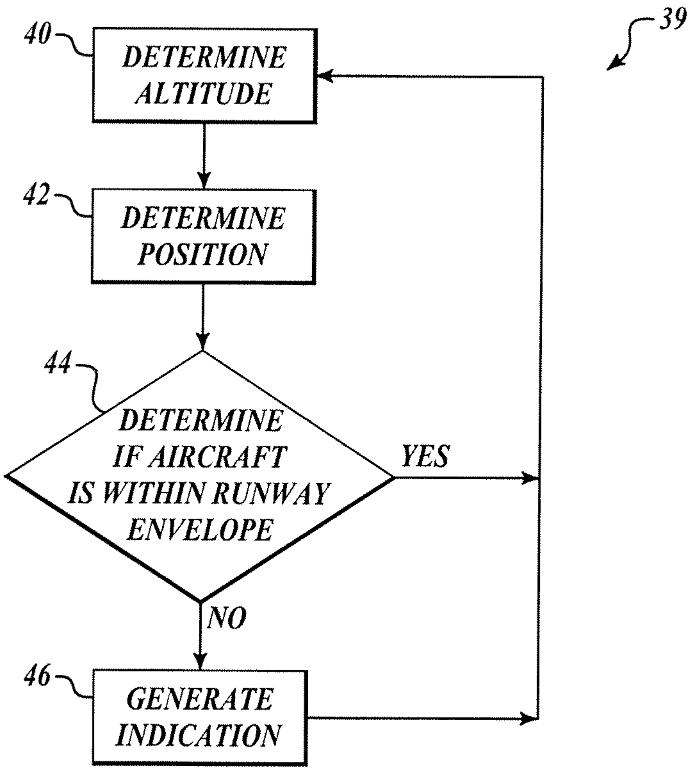
FIG. 5 is a block diagram of a method according to the present invention.

FIG. 5 is a block diagram of a method 39 according to the present invention. At a block 40, an altitude of an aircraft is ascertained. Next at a block 42, a position of the aircraft is ascertained. At a decision block 44, if the position of the aircraft is within a pre-determined runway envelope, the method 39 returns to the first block 40. If the position of the aircraft is outside a pre-determined runway envelope, an indication that the aircraft is outside the pre-determined runway envelope is generated at a block 46, and the method 39 returns to block 40.

Figure 6:
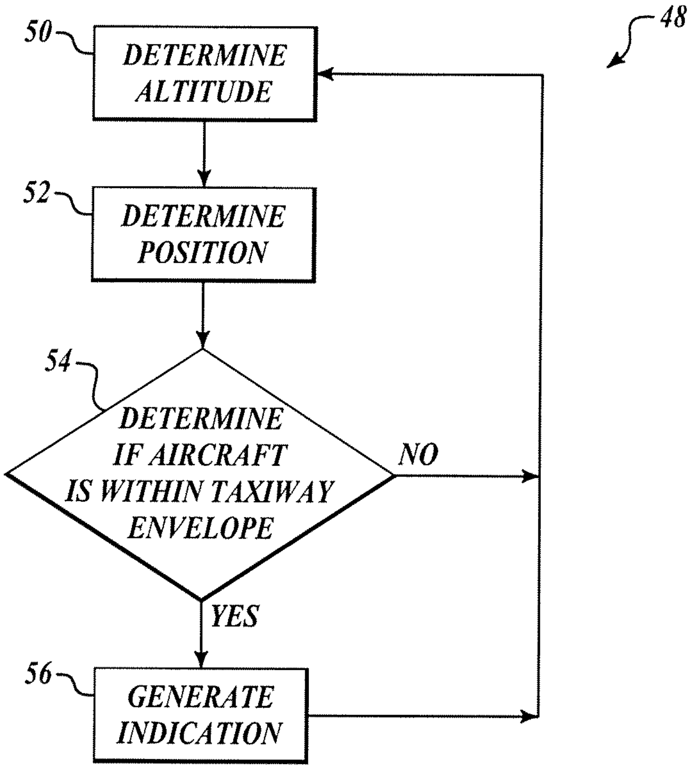
FIG. 6 is a block diagram of an alternate method according to the present invention.

FIG. 6 is a block diagram of a method 48 according to the present invention. At a block 50, an altitude of an aircraft is ascertained. Next at a block 52, a position of the aircraft is ascertained. At a decision block 54, if the position of the aircraft is outside of a pre-determined taxiway envelope, the method 48 returns to the first block 50. If the position of the aircraft is inside the pre-determined taxiway envelope, an indication that the aircraft is inside the pre-determined taxiway envelope is generated at a block 56, and the method 48 returns to block 50.

While the preferred embodiment of the invention has been illustrated and described, as noted above, many changes can be made without departing from the spirit and scope of the invention. For example, in an aircraft with EGPWS, the taxiway approach advisory system could be integrated into the EGPWS. The runway and/or taxiway envelope could be any size and/or shape. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method for alerting a flight crew of an aircraft when the aircraft is flying an approach to a taxiway, the method comprising:
- determining altitude of the aircraft;
- determining whether the aircraft is within an envelope surrounding a predetermined runway based on a position of the aircraft, wherein the envelope has at least a first dimension associated with a first dimension of the runway and at least a second dimension with a second dimension of the runway; and
- issuing an indication that the aircraft is approaching a taxiway if the aircraft is not within the runway envelope and the determined altitude is below a predefined threshold.

2. The method of claim 1, wherein determining whether the aircraft is within the envelope includes accessing runway information from a computer-readable memory.

3. The method of claim 1, wherein issuing an indication includes issuing at least one of a visual indication and an aural indication.

4. The method of claim 1, wherein a width of the runway envelope is twice the width of the runway, and a length of the runway envelope extends 1 nautical mile from an approach end of the runway.

5. The method of claim 1, wherein a width of the runway envelope is twice the width of the runway plus 400 feet and a length of the runway envelope extends 3 nautical miles from an approach end of the runway.

6. The method of claim 3, wherein the indication includes a voice recording.

7. The method of claim 3, wherein the indication includes a visual indicator on one of a map display and a cockpit display.

8. The method of claim 3, wherein the indication includes a text message on one of an Enhanced Ground Proximity Warning System (EGPWS) display, a primary flight display (PFD), a Navigation Display (ND), a Multi-Function Display (MFD), a heads-up display (HUD), and any other cockpit display.

9. The method of claim 3, wherein the indication includes an alert, including at least one of a caution, an advisory, and a warning.

10. A device comprising:
- a non-trasitory computer-readable memory containing runway information;
- a processor including:
  - a component for accessing the runway information from the memory and determining if the aircraft is within a runway envelope based on a position of the aircraft, wherein the envelope has at least a first dimension associated with a first dimension of the runway and at least a second dimension with a second dimension of the runway; and
  - a component for issuing an indication that the aircraft is approaching a taxiway if the aircraft is not within the runway envelope and the aircraft is below a predetermined altitude.

11. The device of claim 10, further comprising:
- one of a visual indicator and an aural indicator.

12. The device of claim 11, wherein the aural indicator further includes a voice recording.

13. The device of claim 11, wherein the visual indicator includes one of a lamp, a Light Emitting Diode (LED), an indicator on a map display, and an indicator on any cockpit display.

14. The device of claim 11, wherein the visual indicator includes a text message displayed on one of an Enhanced Ground Proximity Warning System (EGPWS) display, a primary flight display (PFD), a Navigation Display (ND), a Multi-Function Display (MFD), a heads-up display (HUD), and any other cockpit display.

15. An aircraft comprising:
- a computer-readable memory containing runway information;
- a sensor for determining altitude of the aircraft;
- a sensor for determining aircraft position; and
- a processor including:
  - a component for accessing the runway information from the memory and determining if the aircraft is within a runway envelope based on the runway information and the determined position, wherein the envelope has at least a first dimension associated with a first dimension of the runway and at least a second dimension with a second dimension of the runway; and
  - a component for issuing an indication that the aircraft is approaching a taxiway if the aircraft is not within the runway envelope and the determined altitude is below a predefined threshold.

* * * * *